United States Patent
Raymaekers

(10) Patent No.: US 12,361,920 B2
(45) Date of Patent: Jul. 15, 2025

(54) CONTROL DEVICE AND METHOD FOR AUTOMATICALLY ADAPTING AN ARTIFICIAL ENGINE SOUND

(71) Applicant: TOYOTA MOTOR EUROPE, Brussels (BE)

(72) Inventor: Christopher Raymaekers, Brussels (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 17/917,766

(22) PCT Filed: Apr. 7, 2020

(86) PCT No.: PCT/EP2020/059862
§ 371 (c)(1),
(2) Date: Oct. 7, 2022

(87) PCT Pub. No.: WO2021/204359
PCT Pub. Date: Oct. 14, 2021

(65) Prior Publication Data
US 2023/0169951 A1    Jun. 1, 2023

(51) Int. Cl.
*G10K 15/02* (2006.01)
*B60Q 5/00* (2006.01)

(52) U.S. Cl.
CPC ............. *G10K 15/02* (2013.01); *B60Q 5/005* (2013.01)

(58) Field of Classification Search
CPC .................................................. H04R 2499/13
USPC ......................................................... 381/86
See application file for complete search history.

(56) References Cited

U.S. PATENT DOCUMENTS

| | | | |
|---|---|---|---|
| 8,977,499 B1* | 3/2015 | Prokhorov | G08G 1/0962 |
| | | | 701/538 |
| 2012/0062375 A1 | 3/2012 | Takeuchi | |
| 2013/0294619 A1 | 11/2013 | Valeri et al. | |
| 2013/0304335 A1* | 11/2013 | Suzuki | B60W 30/18136 |
| | | | 701/70 |
| 2015/0016627 A1 | 1/2015 | Barlow, Jr. et al. | |
| 2018/0001818 A1 | 1/2018 | Reilly et al. | |
| 2021/0061282 A1* | 3/2021 | Jafari Tafti | G05D 1/0088 |
| 2022/0219677 A1* | 7/2022 | Hwang | B60W 40/114 |
| 2023/0169951 A1* | 6/2023 | Raymeakers | G10K 15/02 |
| | | | 381/86 |

FOREIGN PATENT DOCUMENTS

WO    2017/067570 A1    4/2017

OTHER PUBLICATIONS

Dec. 22, 2020 International Search Report issued in International Patent Application No. PCT/EP2020/059862.
Dec. 22, 2020 Written Opinion issued in International Patent Application No. PCT/EP2020/059862.

* cited by examiner

*Primary Examiner* — Alexander Krzystan
(74) *Attorney, Agent, or Firm* — Oliff PLC

(57) ABSTRACT

A control device for a sound-system of a vehicle with an engine is configured to control the sound-system to generate an artificial engine sound, to monitor longitudinal and/or lateral vehicle acceleration, and to adapt the generated artificial engine sound as a function of the longitudinal and/or lateral vehicle acceleration. A corresponding method adapts an artificial engine sound for a vehicle.

12 Claims, 1 Drawing Sheet

CONTROL DEVICE AND METHOD FOR AUTOMATICALLY ADAPTING AN ARTIFICIAL ENGINE SOUND

FIELD OF THE DISCLOSURE

The present disclosure is related to a control device for a sound-system of a vehicle for generating and automatically adapting an artificial engine sound and also to a respective method.

BACKGROUND OF THE DISCLOSURE

The use of stepless transmissions in vehicles, as e.g. continuously variable transmissions (CVT) or respective planetary gearbox transmissions, has become popular due to their enhanced efficiency. In particular, such transmissions are used in hybrid vehicles. A stepless transmission can provide improved fuel economy when compared to fixed gear ratio transmissions. However, when accelerating a vehicle with a stepless transmission, the actual engine rotation per minute (rpm) will increase fast to high levels and will remaining constant at a maximum rpm, meanwhile the vehicle is further accelerating. In other words, the transmission is configured such that the engine rpm is regulated independent of the vehicle speed. Said maximum rpm is a constant saturated rpm. The resulting engine sound has a constant, relatively high frequency, which causes a rubber band feeling. This engine sound creates annoyance, especially for customers who are used to drive manual or automatic gearbox vehicles with a fixed gear transmission. Such gearbox vehicles provide an increasing engine sound frequency when accelerating. Once a certain maximum frequency is reached, the fixed gear transmission is shifted to the next upper gear and the engine sound frequency is returned to a lower frequency, in order to be re-increased. The resulting engine sound has thus a step shift pattern comprising a plurality of up-shifts of the fixed gear transmission.

However, also in the case the vehicle has a conventional fixed gear transmission such as manual, automatic or dual clutch systems, the sound generated by a drive train with a reduced fuel consumption (e.g. having a four cylinder engine) may not correspond to the expectations of the driver.

It is known to provide a vehicle with a so-called engine sound enhancement (ESE) system. Such a system generates an artificial engine sound, which shall ameliorate the impression of the customer.

For example, US 2013/0294619 A1 discloses an ESE system in a CVT vehicle for emitting an audio signal that is blended with an engine sound emitted from the engine to mimic a shifting sound that a theoretical fixed gear transmission creates while shifting gears. In particular, a plurality of ESE tones can be superimposed on the engine orders.

US2015016627 (A1) (corresponding to U.S. Pat. No. 9,365,158 (B2)) discloses a control system provided for a vehicle having an engine which transitions between an activated mode and a deactivated mode. The control system includes a vehicle bus transmitting a signal indicating a vehicle selected mode and if the engine is operating in one of the activated mode and the deactivated mode. The control system also includes an engine sound enhancement ("ESE") module configured to receive the signal. The ESE module is configured to select at least one ESE tone and a set of ancillary tones associated with one or more of the deactivated mode, the activated mode, and an activation transition. The ESE module selects a specific type of ancillary tones based on the vehicle selected mode However, such generated engine sound may not always suitably reflect the driving intention of the real driver.

SUMMARY OF THE DISCLOSURE

Currently, it remains desirable to provide a control device which provides a more realistic engine sound generation, in particular with regard to the driver's dynamic driving intention.

Therefore, according to embodiments of the present disclosure, a control device is provided for a sound-system of a vehicle with an engine. The engine may be operable e.g. with a constant saturated or an increasing rotation per minute (rpm) during acceleration of the vehicle. The control device is configured to control the sound-system to generate an artificial engine sound (which may e.g. correspond to a virtual engine with an increasable rotation per minute during acceleration), to monitor longitudinal and/or lateral vehicle acceleration, and to adapt the generated artificial engine sound as a function of the longitudinal and/or lateral vehicle acceleration.

By providing such a control device, it becomes possible to provide artificial engine sound inside a vehicle to emphasize a specific driving mood, for example for emphasizing the vehicle's dynamic behavior by generating a sportier interior engine sound. In this context it is proposed to automatically adapt the artificial generated engine sound depending on the driver's driving style detected in real-time. In case e.g. an aggressive/sporty driving style is recognized, a sportier artificial engine sound may be generated without any manual intervention of the driver.

Accordingly, it becomes possible to automatically activate and adapt the artificial engine sound depending on the current driving style. By matching the interior engine sound with the driver's dynamic drying intentions, a more engaging and appealing driving experience can be created Hence, the driver is no longer required to manually activate or select his/her desired artificial engine sound output.

The artificial engine sound may be defined by the overall (sum of all orders together is increased) sound pressure level (i.e. loudness) and/or the frequency balance determined by individual harmonic orders sound pressure levels of the artificial engine sound. In other words, the control device is configured to adapt the artificial engine sound by: adapting the overall sound pressure level determined by the sum of all harmonic orders of the artificial engine sound, and/or by adapting the frequency balance determined by the sound pressure levels of individual harmonic orders of the artificial engine sound. In this way the control device may be configured to adapt said sound pressure level and/or said frequency balance as a function of the longitudinal and/or lateral vehicle acceleration.

The control device may be configured to increase the sound pressure of the main firing order of the artificial engine sound in correspondence to an increasing (longitudinal (Gx)) vehicle acceleration. Accordingly, the increasing sound pressure of the main firing order, the driver can give the impression of increasing engine torque. In correspondence, the sound pressure of the main firing order of the artificial engine sound may be decreased in correspondence to a decreasing (longitudinal (Gx)) vehicle acceleration or a vehicle deceleration. Additionally or alternatively, the control device may be configured to increase the (overall) sound pressure level and/or to add further harmonic orders to the frequency balance of the artificial engine sound as a function of an increase of longitudinal and/or lateral vehicle acceleration.

The control device may be configured to, in case the monitored longitudinal and/or lateral vehicle acceleration exceeds a predetermined initial threshold, activate the artificial engine sound generation.

For example, the artificial engine sound is only switched on, in case the driver causes a certain minimum longitudinal and/or lateral vehicle acceleration.

The control device may be configured to subsequently adapt the artificial engine sound as a function of the longitudinal and/or lateral vehicle acceleration.

The control device may be configured to calculate an aggressiveness index as a function of the longitudinal and/or lateral vehicle acceleration, and adapt the artificial engine sound as a function of said aggressiveness index.

Hence, a driver aggressiveness dependent artificial engine sound may be generated. In other words, it becomes possible to automatically adapt/vary the vehicle's interior artificial engine sound depending on the driver's driving aggressiveness.

Said aggressiveness index may be calculated as a weighted sum of the longitudinal and lateral vehicle acceleration, e.g. in real-time, said calculation may be done e.g. based on outputs of longitudinal and lateral vehicle accelerator sensors which are connected to the control device.

The control device may be configured to compare the aggressiveness index to a plurality of predefined successive index thresholds and play a preprogrammed variation of artificial engine sound depending on the aggressiveness index in reference to the plurality of predefined successive index thresholds.

Accordingly, in order to assess the driving style, a continuous (weighted) monitoring of both longitudinal and lateral vehicle accelerations may be compared to objective (index) threshold levels. Based on said comparison the control device may decide the final output level of artificial sound generation.

The interior artificial engine sound generation may be adapted depending on driver's aggressiveness, i.e. dynamic driving style, which is estimated objectively by means of comparing real-time longitudinal and lateral vehicle accelerations versus reference threshold values. The variation in artificial engine sound may be both in overall sound pressure level as frequency balance (determined by harmonic motor orders).

Accordingly, aggressive acceleration and steering inputs from the driver may create increased longitudinal (Gx) and lateral (Gy) acceleration levels of the vehicle itself. As such, continuously monitoring these Gx and Gy acceleration levels allows for an objective assessment of the drivers aggressiveness and dynamic driving intentions. A weighted summation of these Gx and Gy values may create a single 'aggressiveness index' value which in turn can be compared to objective threshold reference levels. Whenever the calculated 'aggressiveness Index' exceeds a certain predefined threshold level, a preprogrammed variation of the interior artificial engine sound may be activated.

The artificial engine sound may correspond to a virtual engine with an increasable rotation per minute during acceleration, in case the the real engine of the vehicle is operable with a constant saturated rotation per minute (rpm) during acceleration of the vehicle. For example, the vehicle may have in this case a stepless-like transmission.

Alternatively, the virtual engine speed may correspond to the frequency of the sound of the real engine, in case the rotation per minute (rpm) of the real engine of the vehicle increases during acceleration of the vehicle. For example, the vehicle may have in this case a conventional fixed gear transmission such as manual, automatic or dual clutch systems. In such cases the artificial engine sound may be configured to accentuate the sound of the real engine (e.g. instead of mimicking a different virtual engine).

The artificial engine sound may comprise one or more orders which are superimposed on the orders of the actual engine sound generated by the engine of the vehicle.

The artificial engine sound may correspond to a step shift pattern of a virtual engine with a fixed gear transmission.

The frequency of a dominant order of the artificial engine sound may be increased until a frequency maximum, before a virtual up-shift is performed.

The dominant order of the artificial engine sound may blend at the frequency maximum with the main firing order of the actual engine sound or with one of its harmonics.

The step shift pattern of the virtual engine may present e.g. substantially a sawtooth profile, wherein during acceleration of the vehicle the successive sawteeth of the step shift pattern are increasingly lengthened in time.

During acceleration of the engine of vehicle the artificial engine sound may blend with the actual engine sound, such that the frequency of the dominant order of the artificial engine sound matches the frequency progression of the equal order of the actual engine sound.

By providing such a configuration, the dominant order of the artificial sound can converge to the main firing order of the actual engine sound by increasing its frequency and match at its frequency maximum with the frequency of the main firing order of the actual engine sound. Alternatively, it is also possible that the dominant order of the artificial sound is set to be equal to or greater than a main firing order of the actual engine sound of the vehicle. In these cases, in particular, if the dominant order of the artificial sound is set to be greater than the main firing order of the actual engine sound, the frequency maximum may be determined such that the dominant order of the artificial engine sound blends at the frequency maximum with the the nearest, above lying harmonic of the main firing order of the actual engine sound.

Further aspects of the present disclosure may comprises e.g. the following:

The main firing order m of an engine is equal to the number of cylinders n divided by two, i.e. m=n/2. For example, if an engine comprises 4 cylinders, its main firing order is 2. It shall be noted that the main firing order of the engine sound of the vehicle can also be referred to as the dominant order of said engine sound. Vice versa, the dominant order of the artificial engine sound can also be referred to as the main firing order of the virtual engine. The different terms as used above merely serve for an easier discrimination between the artificial sound of the virtual engine and the actual sound of the real engine.

Preferably, the dominant order of the artificial sound is set to be smaller than a main firing order of the actual engine sound of the vehicle.

Advantageously, the dominant order of the artificial engine sound is the closest smaller order with respect to the main firing order of the actual engine sound of the vehicle. In particular it may be a half order or one order smaller than the main firing order of the actual engine sound.

In this way, the dominant order of the artificial engine sound can be relatively close to the main firing order of the actual engine sound of the vehicle, so that their frequency levels differ generally less. At the same time the dominant order of the artificial engine sound can mimic an acceleration sound thereby increasing its frequency and converting to the constant frequency of the main firing order of the actual engine sound, until it matches with the main firing order of the actual engine sound, before the virtual shifting is performed. Consequently, it is preferable that during acceleration of the vehicle the frequency of the dominant order of the artificial sound is increased until a predetermined frequency maximum, before the virtual shifting is performed.

The dominant order of the artificial engine sound may depend on the cylinder configuration, in particular on the number of cylinders of the vehicle.

In particular, the dominant order of the artificial engine sound may be determined by the equation $d=(n/2)-0.5$, wherein d is the dominant order of the artificial engine sound and n is the number of cylinders of the vehicle.

In such a configuration, the dominant order of the artificial engine sound is a half order smaller than the main firing order of the actual engine sound.

For example, in case the engine of the vehicle has 4 cylinders, the main firing order of the engine sound is 2. In this case the dominant order of the artificial engine sound is preferably 1.5. In other words the virtual engine comprises preferably 3 virtual cylinders.

As another example, in case the engine of the vehicle has 5 cylinders, the main firing order of the engine sound is 2.5. In this case the dominant order of the artificial engine sound is preferably 2. In other words the virtual engine comprises preferably 4 virtual cylinders.

As still another example, in case the engine of the vehicle has 6 cylinders, the main firing order of the engine sound is 3. In this case the dominant order of the artificial engine sound is preferably 2.5. In other words the virtual engine comprises preferably 5 virtual cylinders. Alternatively, the dominant order of the artificial engine sound may also be 2. In other words the virtual engine may also comprise 4 virtual cylinders. Hence, the dominant order of the artificial engine sound may alternatively be determined by the equation $d=(n/2)-1$.

The dominant order of the generated active sound may additionally depend on the engine type of the virtual vehicle, in particular its virtual cylinder configuration and/or its number of virtual cylinders.

Hence, it is possible to design a specific virtual engine and a corresponding artificial sound of the virtual engine, which mimics a certain engine type, e.g. a specific cylinder confiiguration.

The manual shift pattern of the virtual engine may comprise substantially a sawtooth profile. In particular, during acceleration of the vehicle the successive sawteeth of the manual shift pattern may be increasingly lengthened in time. Hence, the artificial engine sound can optimally mimic the acceleration sound of a vehicle with a fixed gear transmission.

During the acceleration of the engine of vehicle, the artificial engine sound may blend with the actual engine sound, such that the frequency of the dominant order of the artificial engine sound matches the frequency progression of the equal order of the actual engine sound. This blending is preferably performed until the saturation of the acceleration of the engine starts, e.g. at least until the engine reaches 70%, 80% or 90% of its constant saturated rpm. The equal order of the actual engine sound advantageously has the same order number as the dominant order of the artificial engine sound, e.g. in case the dominant order of the artificial engine sound is 1.5 the equal order of the actual engine sound is also 1.5.

In other words, during acceleration of the engine of the vehicle and preferably before the start of saturation of the constant saturated rotation per minute (rpm), the frequency of at least the dominant order, preferably of all orders, of the artificial engine sound may harmonically follow the frequency progression of the respectively equal orders of the actual sound generated by the engine of the vehicle.

Hence, it is impossible or at least almost impossible for the customer to distinguish between the artificial engine sound and the actual engine sound during acceleration of the engine of the vehicle.

Furthermore, when the saturation of the engine acceleration starts, i.e. when the engine starts saturating toward the constant saturated rotation per minute (rpm), the frequency of the dominant order of the artificial engine sound may increase until reaching the frequency maximum, in particular in a substantially linear slope. Preferably, the frequency of all orders of the artificial engine sound increase up to their respective frequency maxima, in particular in a substantially linear slope.

By this configuration it is possible to superimpose the annoying constant saturated engine sound of the actual engine by the artificial engine sound, which mimics an acceleration of the virtual engine.

After reaching the frequency maximum, the frequency of the dominant order may be lowered to blend with the equal order of the actual engine sound. Preferably, the frequencies of all orders are lowered to blend with the respective equal orders of the actual engine sound.

By this configuration, it is possible to mimic a shifting of the virtual engine.

The present disclosure further relates to a sound system for a vehicle with an engine. The sound system comprises a speaker system and/or at least one electromagnetic shaker to generate an artificial engine sound, and the control device according to the present disclosure.

The present disclosure further relates to a vehicle comprising an engine operable with a constant saturated rotation or an increasable rotation per minute (rpm) during acceleration of the vehicle, a longitudinal and/or lateral vehicle accelerator sensor, and a sound system according to the present disclosure.

The vehicle may further comprise a stepless transmission configured such that the engine is operable at the constant saturated rotation per minute (rpm) what may allow a constant saturated rotation per minute (rpm) during acceleration. Alternatively, vehicle may comprise a conventional fixed gear transmission such as manual, automatic or dual clutch systems what may allow an increasable rotation per minute (rpm) during acceleration.

The present disclosure further relates to a method of generating an artificial engine sound for a vehicle with an engine. The method comprises the following steps:

generating the artificial engine sound, monitoring longitudinal and/or lateral vehicle acceleration, and adapting the generated artificial engine sound as a function of the longitudinal and/or lateral vehicle acceleration.

The method may comprise further steps or characteristics which correspond to the features or functions of the control device as described above.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
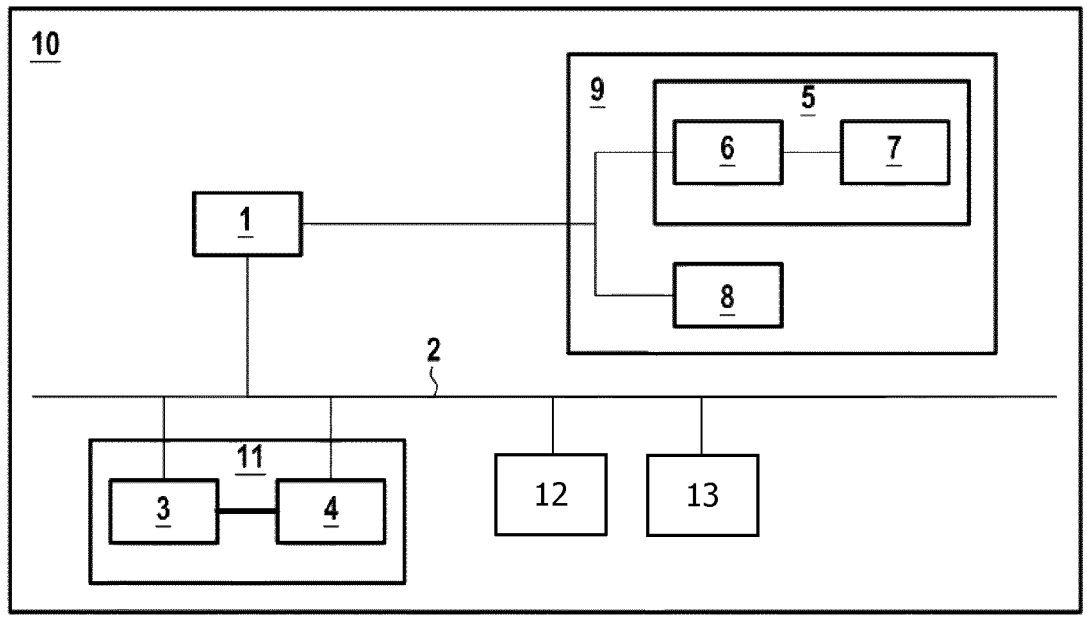
FIG. 1 shows a schematic representation of a vehicle comprising a control device according to an embodiment of the present disclosure.

FIG. 1 shows a schematic representation of a vehicle comprising a control device according to an embodiment of the present disclosure. The vehicle 10 may be a hybrid vehicle. The vehicle 10 comprises an engine 3, which includes preferably an internal combustion engine. Alternatively or additionally the engine 3 may be a hybrid engine. The vehicle 10 may further comprise a transmission 4, e.g. a continuously variable transmission (CVT). Instead of the CVT, the vehicle 10 may also comprise another type of a stepless transmission, as e.g. a respective planetary gearbox transmission. The CVT 4 is connected to the engine 3. The CVT 4 and the engine 3 are comprised by a drivetrain 11 of the vehicle. Due to the CVT, the engine 3 can be operated with a constant saturated rotation per minute (rpm) during acceleration of the vehicle 10. The engine 3 and the CVT 4 are connected to a vehicle bus 2, which controls the engine 3 and the CVT 4 by transmitting control signals to the engine 3 and the CVT 4 and receiving measuring signals from the engine 3 and/or the CVT 4. For this purpose the vehicle bus may be connected to or comprise a central control unit, such as an electronic control unit (ECU) (not shown). Alternatively, instead of the stepless transmission (CVT 4), the vehicle may comprise a conventional fixed gear transmission 4 such as manual, automatic or dual clutch systems, what may allow an increasable rotation per minute (rpm) during acceleration.

The control device 1 is connected to the transmission 4 and the engine 3, preferably via the vehicle bus 2. The control device 1 may also be connected to the central control unit (not shown) of the vehicle or may constitute said central control unit.

The control device preferably receives operating conditions of the vehicle, in particular of the engine 3 and/or the transmission 4, such as the current rotation per minute (rpm) of the engine, the vehicle speed, the engine speed, the engine torque, the accelerator pedal position, the vehicle acceleration, and/or the transmission state of the transmission 4.

Moreover the control device is connected to a longitudinal vehicle accelerator sensor (Gx) 12 and a longitudinal and lateral vehicle accelerator sensor (Gy) 13.

Moreover the control device may comprise a memory (not shown). The memory may store operating parameters of a virtual engine, whose artificial engine sound is simulated by the control device 1. In particular, these operating parameters of the virtual engine may include the virtual engine type, the number of virtual cylinders and the virtual cylinder configuration of the virtual engine, the rpm range and/or the acceleration characteristics of the virtual engine. Additionally or alternatively said operating parameters may include the sound progression profiles of the virtual engine, as they are described below in context of FIG. 2, especially different sound patterns characterized by specific predefined sound pressure levels and/or the frequency balances.

The memory may additionally store operating parameters of a virtual fixed gear transmission. In particular, the virtual fixed gear transmission may be any type of fixed gear transmission that upshifts from a lower gear to a higher gear based on operating conditions of the virtual engine, or downshifts from a higher gear to a lower gear. The virtual fixed gear transmission may be e.g. a five-speed or a six-speed automatic transmission. Accordingly, said operating parameters may include the number of virtual gears and information regarding the sound characteristics when the upshifts or downshifts are performed.

The control device 1 may comprise an application specific integrated circuit (ASIC), an electronic circuit, a processor (shared, dedicated, or group), a combinational logic circuit, a memory that executes one or more software programs, and/or other suitable components that provide the described functionality.

The control device 1 is further connected to a sound-system 9. The control device 1 controls the sound-system 9 such that it outputs the artificial engine sound of the virtual engine. The sound-system 9 may comprise a cabin speaker system 5 and/or at least one electromagnetic shaker 7. The cabin speaker system 5 may comprise an amplifier 6 and one or more speakers 7. The electromagnetic shakers 8 may be attached to the fire wall of the vehicle.

According to the present disclosure the control device 1 is configured to control the sound-system 9 to generate an artificial engine sound corresponding to a virtual engine with an increasable rotation per minute during acceleration, to monitor longitudinal and/or lateral vehicle acceleration, and to adapt the generated artificial engine sound as a function of the longitudinal and/or lateral vehicle acceleration.

In particular, during driving, the longitudinal (Gx) and lateral (Gy) accelerometer sensors 12, 13 continuously measure/monitor the vehicle accelerations. A weighted sum of accelerations Gx and Gy (referred to as 'aggressiveness index') are calculated in real-time as an objective estimator for the driver's dynamic driving style (inside the control device 1 being e.g. a calculation ECU).

Depending on this 'aggressiveness index' value in reference to predefined threshold values, a certain preprogramed variation of the artificial engine sound is played. This may be done by means of control signal which is send from the 'Driver aggressiveness' index calculation ECU (i.e. the control device 1 carrying out the respective functionality) to an interior artificial engine sound control ECU (provided e.g. by the sound system 9).

Figure 2:
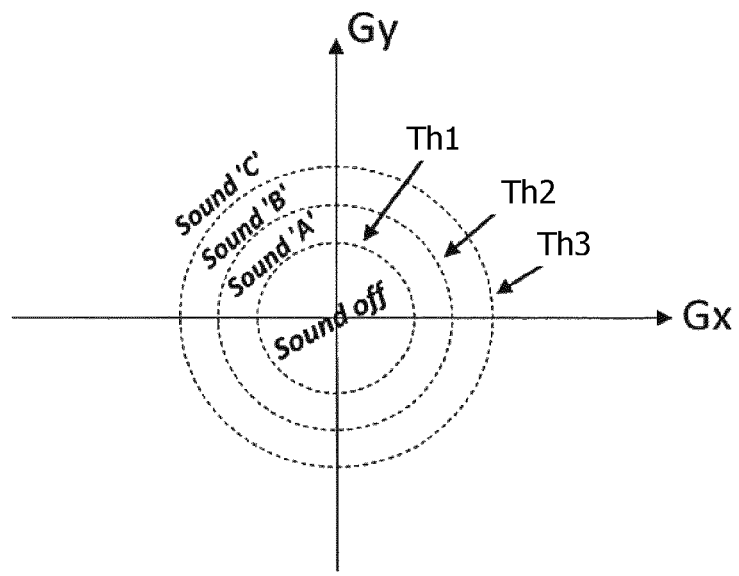
FIG. 2 shows a schematic diagram of an artificial engine sound variation, which is dependent on vehicle acceleration, according to an embodiment of the present disclosure.

FIG. 2 shows a schematic diagram of an artificial engine sound variation, which is dependent on vehicle acceleration, according to an embodiment of the present disclosure.

In particular, FIG. 2 exemplifies how different variations of accelerations Gx and Gy can activate different artificial engine sound variations. In this simplified example, three alternative artificial engine sound variations 'A', 'B' and 'C' are considered. However, there may also be more sound variations e.g. 10 or 20. The sound variations can have distinct characteristics in both overall sound pressure level (dB) and/or spectral frequency content (Hz).

When driving slowly/calmly, i.e. not aggressively, the weighted combination of Gx and Gy does not exceed the 'driver aggressiveness' index threshold Th1. In such a case, the artificial interior engine sound will remain de-activated.

When driving more dynamically (exceeding the 'driver aggressiveness index threshold Th1), the artificial interior engine sound will be activated. If in such a case the weighted combination of Gx and Gy reaches the area between index threshold Th1 and index threshold Th2, the artificial engine sound variant 'A' will be played. If the weighted combination of Gx and Gy reaches the area between index threshold Th2 and index threshold Th3 (e.g. when the acceleration is further increased), the artificial engine sound variant 'B' will be played. If the weighted combination of Gx and Gy exceeds index threshold Th3 (e.g. when the acceleration is further increased), the most sporty sound variant 'C' will be played. In correspondence, a deceleration leads to respective changes from sound variant 'C' to sound variant 'B' and then to sound variant 'A'.

Desirably the artificial engine sound variant 'A' to 'C' have an increasing aggressiveness index which may be defined by an increasing sound pressure and/or by adding further harmonic orders to the frequency balance of the artificial engine sound.

However, it is again emphasized that there is no limit on the total number of possible sound variations and corresponding index thresholds and that further ways are possible to increase the aggressiveness index of the artificial engine sound.

Throughout the disclosure, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A control device for a sound-system of a vehicle with an engine,
the control device being configured to:
control the sound-system to generate an artificial engine sound,
monitor real-time longitudinal and/or lateral vehicle acceleration,
adapt the generated artificial engine sound as a function of the longitudinal and/or lateral vehicle acceleration,
calculate an aggressiveness index as a function of the longitudinal and/or lateral vehicle acceleration, and
adapt the artificial engine sound as a function of said aggressiveness index,
wherein the aggressiveness index is a weighted sum of the longitudinal and lateral vehicle acceleration calculated in real-time from outputs of longitudinal and lateral vehicle accelerator sensors which are connectable to the control device.

2. The control device according to claim 1, wherein the control device is configured to adapt the artificial engine sound by at least one of:
adapting an overall sound pressure level determined by a sum of all harmonic orders of the artificial engine sound, and
adapting a frequency balance determined by a sound pressure levels of individual harmonic orders of the artificial engine sound.

3. The control device according to claim 1, wherein the control device is configured to increase at least one of a sound pressure level and a sound pressure of a main firing order of the artificial engine sound as a function of an increase of longitudinal and/or lateral vehicle acceleration.

4. The control device according to claim 1, wherein the control device is configured to, in case the monitored longitudinal and/or lateral vehicle acceleration exceeds a predetermined initial threshold, activate the artificial engine sound generation.

5. The control device according to claim 4, wherein the control device is configured to subsequently adapt the artificial engine sound as a function of the longitudinal and/or lateral vehicle acceleration.

6. The control device according to claim 1, wherein the control device is configured to compare the aggressiveness index to a plurality of predefined successive index thresholds and play a preprogrammed variation of artificial engine sound depending on the aggressiveness index in reference to the plurality of predefined successive index thresholds.

7. The control device according to claim 1, wherein the artificial engine sound corresponds to a virtual engine with an increasable rotation per minute during acceleration, in case the real engine of the vehicle is operable with a constant saturated rotation per minute during acceleration of the vehicle, or
the virtual engine speed corresponds to a frequency of a sound of the real engine, in case the rotation per minute of the real engine of the vehicle increases during acceleration of the vehicle.

8. The control device according to claim 1, wherein the artificial engine sound comprises one or more orders which are superimposed on orders of an actual engine sound generated by the engine of the vehicle, and/or
the artificial engine sound corresponds to a step shift pattern of a virtual engine with a fixed gear transmission, and a frequency of a dominant order of the artificial engine sound is increased until a frequency maximum, before a virtual up-shift is performed.

9. The control device according to claim 8, wherein the dominant order of the artificial engine sound blends at the frequency maximum with a main firing order of the actual engine sound or with one of its harmonics, and/or
the step shift pattern of the virtual engine presents substantially a sawtooth profile, wherein during acceleration of the vehicle successive sawteeth of the step shift pattern are increasingly lengthened in time.

10. The control device according to claim 8, wherein
during acceleration of the engine of vehicle, the artificial
engine sound blends with the actual engine sound, such
that the frequency of the dominant order of the artificial
engine sound matches a frequency progression of the
equal order of the actual engine sound.

11. A sound system for a vehicle with an engine comprising:
a speaker system or at least one electromagnetic shaker or
a combination thereof, to generate an artificial engine
sound, and
the control device according to claim 1.

12. A vehicle comprising:
an engine,
a longitudinal and/or lateral vehicle accelerator sensor,
and
a sound system according to claim 11.

* * * * *